United States Patent [19]
Bennett

[11] 3,991,418
[45] Nov. 9, 1976

[54] ELECTROMAGNETIC WAVE DIRECTION FINDING USING DOPPLER TECHNIQUES

[75] Inventor: Sidney M. Bennett, Waban, Mass.

[73] Assignee: Avco Corporation, Cincinnati, Ohio

[22] Filed: Feb. 10, 1970

[21] Appl. No.: 14,810

[52] U.S. Cl. .............................. 343/113 R; 343/119
[51] Int. Cl.² ........................ G01S 3/02; C01S 3/28; G01S 3/46
[58] Field of Search .............. 343/113, 119, 113 DE

[56] References Cited
UNITED STATES PATENTS

| | | | |
|---|---|---|---|
| 3,090,044 | 5/1963 | Wilmotte | 343/113 |
| 3,120,000 | 1/1964 | Wilmotte | 343/113 |
| 3,482,246 | 12/1969 | Cox | 343/113 X |

*Primary Examiner*—T.H. Tubbesing
*Assistant Examiner*—Richard E. Berger
*Attorney, Agent, or Firm*—Charles M. Hogan; Abraham Ogman

[57] ABSTRACT

Skywave propagation of quasi-sinusoidal signal sources generally results in multiple discrete Doppler shifts which can be associated with actual ionospheric modes in existence between the transmitter and receiver terminals at the operating frequency. The invention covers the application of monopulse direction finding techniques through the isolation of energy in each Doppler shifted mode through the use of high resolution spectrum analysis. More particularly, azimuth information is obtained by using the amplitude and/or phase responses of two antennae beams preferably in a monopulse configuration for each Doppler shifted mode.

18 Claims, 9 Drawing Figures

INVENTOR.
SIDNEY M. BENNETT

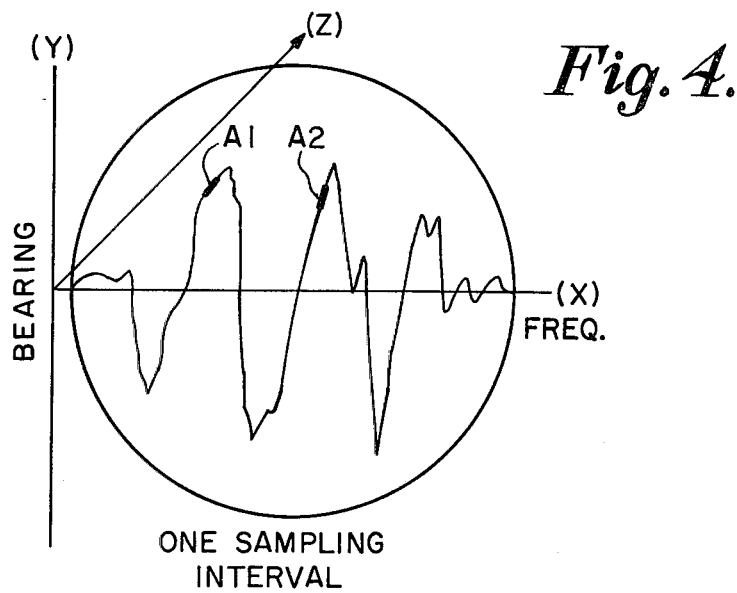
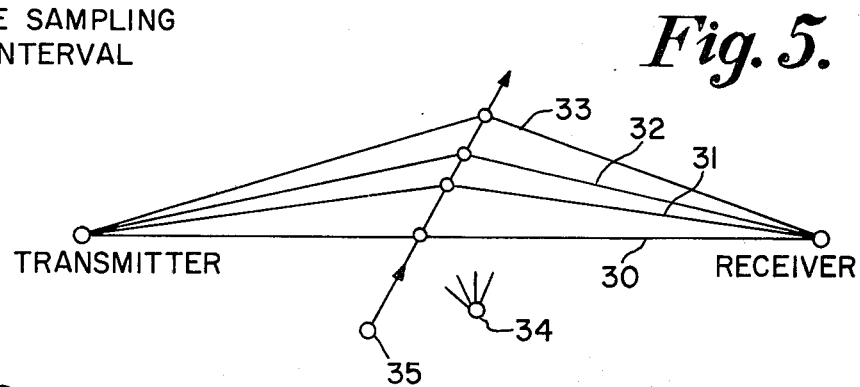
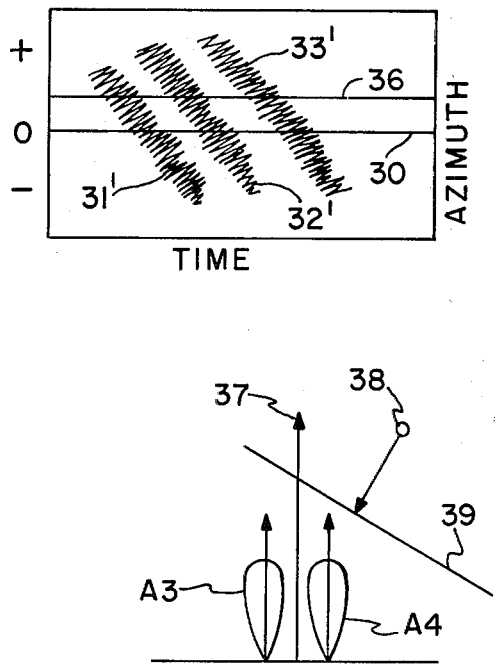
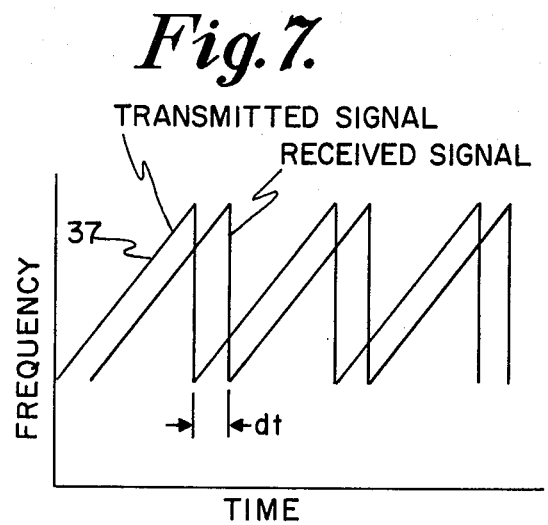

ELECTROMAGNETIC WAVE DIRECTION FINDING USING DOPPLER TECHNIQUES

This invention is directed to the rapid determination of line of bearing angle of arrival of radio skywave transmissions, particularly when more than one propagation mode exists. It may be used with antennae arrays of varying sizes (apertures) for signals of a quasisinusoidal nature. (Typically CW, AM, SSB, FSK, morse and others.)

Older methods such as the Adcock direction finder and the Wullenwebber array depend upon their antenna pattern, which is rotated either electronically, mechanically, or electromechanically, to ascertain the angle of arrival (usually only the azimuthal component) by observing the angular position of the antenna beam when either a maximum or minimum in received field intensity is obtained. These techniques display the detected (i.e., non-coherent) signal including all of the propagating modes.

It is well known that many situations arise wherein the bearing of the received signal tends to wander and/or scintillate about the true bearing and as a consequence the determination of an accurate bearing is rendered difficult and time-consuming. This is often related to the presence of multiple-mode skywave propagation which results in reception of energy from one transmitter on different vertical and/or azimuthal angles. The resultant phase front, when processed in a non-coherent manner (detected by a linear or square law detector or similar device), exhibits undesirable wandering or scintillation, the magnitude and angular spread of which are dependent upon the relative properties of the several interfering modes.

While the realization of the concept is described in terms of squinted-beam amplitude monopulse techniques, the use of phase monopulse techniques and sequential lobing are equally as applicable. Phase monopulse require receivers matched in amplitude and phase and the use of cross-spectral density analysis rather than conventional spectrum analysis with receivers matched only in amplitude.

It is an object of the invention to provide direction finding apparatus for quasi-sinusoidal skywave transmissions which avoid the limitations and disadvantages of prior art apparatus and techniques.

It is another object of the invention to provide a direction finding technique and a system for quasi-sinusoidal transmissions using a monopulse or sequential lobing technique in combination with frequency spectrum analysis of the received Doppler shifted modes.

It is another object of the invention to provide a direction finding technique and system for quasi-sinusoidal transmissions for computing azimuth from two or more incoming Doppler shifted modes to achieve an independent estimate of the line of bearing for each mode.

It is yet another object of the invention to provide a monopulse technique and system for direction finding of quasi-sinusoidal transmissions in which the signal in each Doppler channel is spectrum analyzed prior to using the monopulse technique.

It is still another object of the invention to provide monopulse direction finding techniques and systems for spectrum analyzing received signals in discrete frequency cells and using the spectrum analyzed signals to compute azimuth.

It is an object of the invention to discriminate between electronic countermeasure signals and targets by means of the time history of the azimuthal data.

It is yet another object of the invention to provide direction finding techniques and systems which use data heretofore thought to be interfering Doppler modes to compute azimuth.

In accordance with the invention, a direction finding system for quasi-sinusoidal transmissions comprises means for separating multiple propagation (transmission) modes into pairs of differential Doppler spectrum signals. The system also includes means for ascertaining the amplitude of each differential Doppler spectrum signals. Means for computing the ratio of the amplitudes of the differential Doppler spectrum signals is also provided, and said computed signal being representative of the azimuth of the transmitted signal for each Doppler shifted mode. The technique is applicable whenever two or more modes are received with a differential Doppler shift greater than one frequency resolution cell. When only one mode is present, the technique provides bearing information, but may have no advantage over present art except for temporal averaging.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 4 is a pictorial representation of a visual display;

FIG. 5 pertains to moving target detection;

FIG. 6 represents a moving target display;

FIG. 7 is a curve useful in explaining another application of the invention; and FIG. 8 relates to phase monopulse uses.

Experimental data indicates that when radio energy is received by skywave transmission, the received frequency differs from that transmitted (typically by several parts in $10^6$) and that this variation is an unknown function of time, transmitted frequency, and path geometry. This effect is known as the ionospheric Doppler effect and results from the time rate of change of the total propagation phase path length. This results from variations in the ionospheric electron density or other perturbations along the signal ray paths. Since energy transmitted and undergoing skywave propagation by multiple mode propagation results in multiple ray paths, the ionospheric Doppler shift of each mode will, in general, be slightly different.

Figure 1:
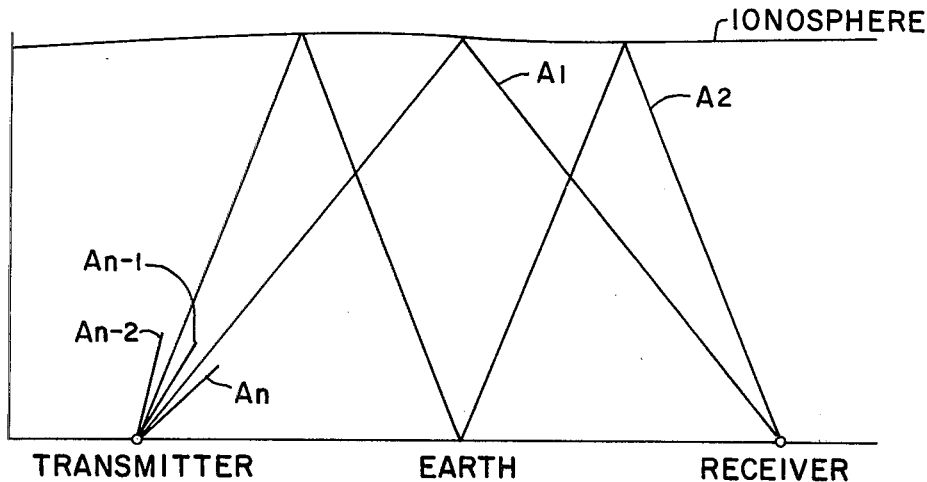
FIG. 1 is a schematic representation illustrating the existence of multiple propagation modes.

In FIG. 1 Doppler modes are illustrated. The number of modes and their respective propagation paths will vary with time as explained above.

Modes $A_1$ and $A_2$ are chosen at random to illustrate the inventive technique.

The implementation of the technique utilizing amplitude information only — a technique termed squinted-beam amplitude monopulse — will be described. This is easier to implement than phase monopulse, since it requires only that the two receivers be matched in gain, rather than in gain and phase.

Consider two beams of an array antenna which overlap at approximately their three decibel points; for convenience of computation the beam shapes are assumed to be Gaussian. It is clear that, for example, if the incoming energy is off the axis of symmetry, the response of one of the beams will be different than that of the other. The amplitude response is written in terms of the gain of each beam (assumed identical on boresight), the 3-db beamwidths $\theta_B$, and the deviation of the target from the axis of symmetry. If the logarithm of the ratio of the amplitude responses of the beams is taken, the function in Equation 1 is derived which is linearly related to the bearing deviation from the axis of symmetry. The proportionality constant depends upon system constants such as the squint angle and 3-db beamwidth.

$$\log \frac{A_1}{A_2} = k \frac{\theta_a}{\theta_{B2}} \theta_T \qquad (1)$$

$A_1$ is the amplitude of the spectral signal derived from one antenna beam of a monopulse system;

$A_2$ is the amplitude of the spectral signal derived from the other antenna beam of a monopulse system;

$\theta_B$ is antenna beam width;

$\theta_a$ is the angle of deviation from the axis of symmetry of each antenna;

$\theta_T$ is the angle of deviation of the received signal from the axis of symmetry;

k is a proportionality constant.

If the received energy, that is the amplitude from each incoming Doppler shifted propagation mode, is processed by a spectrum analyzer, the modes can be resolved into different Doppler spectral signals and detected, further processed and displayed without mutual interaction, thus removing the principal difficulty in prior direction finding techniques and systems.

The frequency resolution (or detection bandwidth) which is attainable by modern real-time spectrum analysis techniques is at least 0.01 Hz, but this requires a hundred second sample of data. The frequency resolution which can be effectively used is determined not by the spectrum analysis hardware, but rather the necessity to accomplish the measurement in a reasonable time.

However, ionospheric modes with differential Dopplers of greater than 0.1 Hz are often observed. Hence, the Doppler monopulse technique will be effective in many instances where the sampling period is ten seconds and the width of a frequency resolution cell is 0.1 Hz.

Figure 2A:
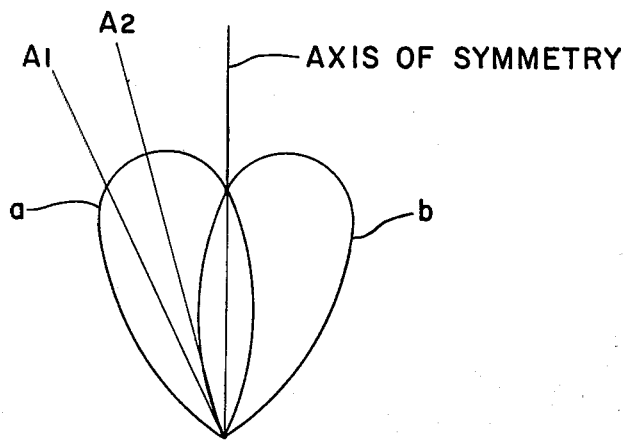
FIG. 2A is a sketch of the azimuthal antenna patterns and two received modes on the same side of the axis of symmetry of the antenna system.

Referring to FIG. 2A, the azimuthal directions of modes $A_1$ and $A_2$ are illustrated in relation to a squinted beam amplitude monopulse antenna system. In this instance both modes lie off the axis of symmetry such that the response of antenna $a$ is greater than that of antenna $b$.

Figure 2B:
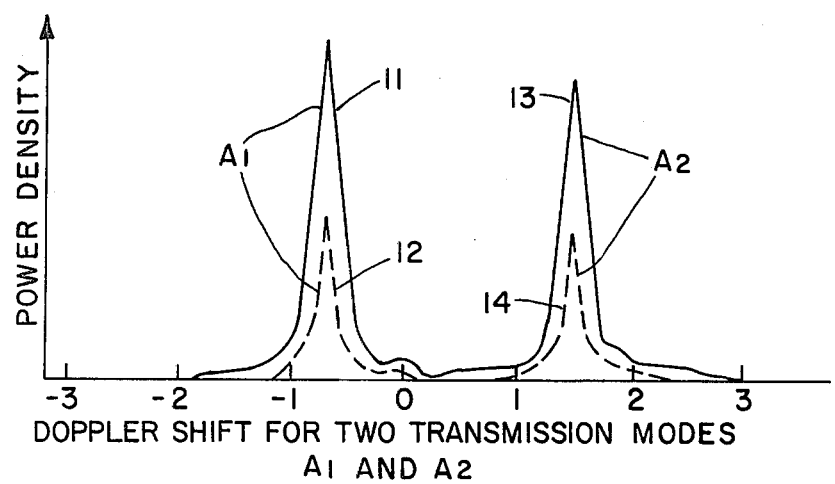
FIG. 2B is a curve depicting the Doppler shift for two transmission modes.

Referring to FIG. 2B of the drawings, there is a curve of power density as a function of the Doppler shift for the two transmission modes $A_1$ and $A_2$ depicted in FIG. 1 and in FIG. 2A. Signals 11 and 12 are associated with mode $A_1$. The difference in amplitude between signals 11 and 12 indicates that the incoming mode $A_1$ signal is offset from the axis of symmetry of the Doppler monopulse antennae.

Signals 13 and 14 represent the differential Doppler spectral signals associated with mode $A_2$.

Signals 11 and 13 are received via antenna a while signals 12 and 14 are received via antenna b.

Using conventional techniques the presence of modes $A_1$ and $A_2$ would tend to cause fluctuations in amplitude and bearing angle to occur in the direction finding equipment. Only after the incoming signals are spectrum analyzed is it possible to differentiate between the modes and thereby compute the azimuth of each mode with a high degree of accuracy.

Figure 3:
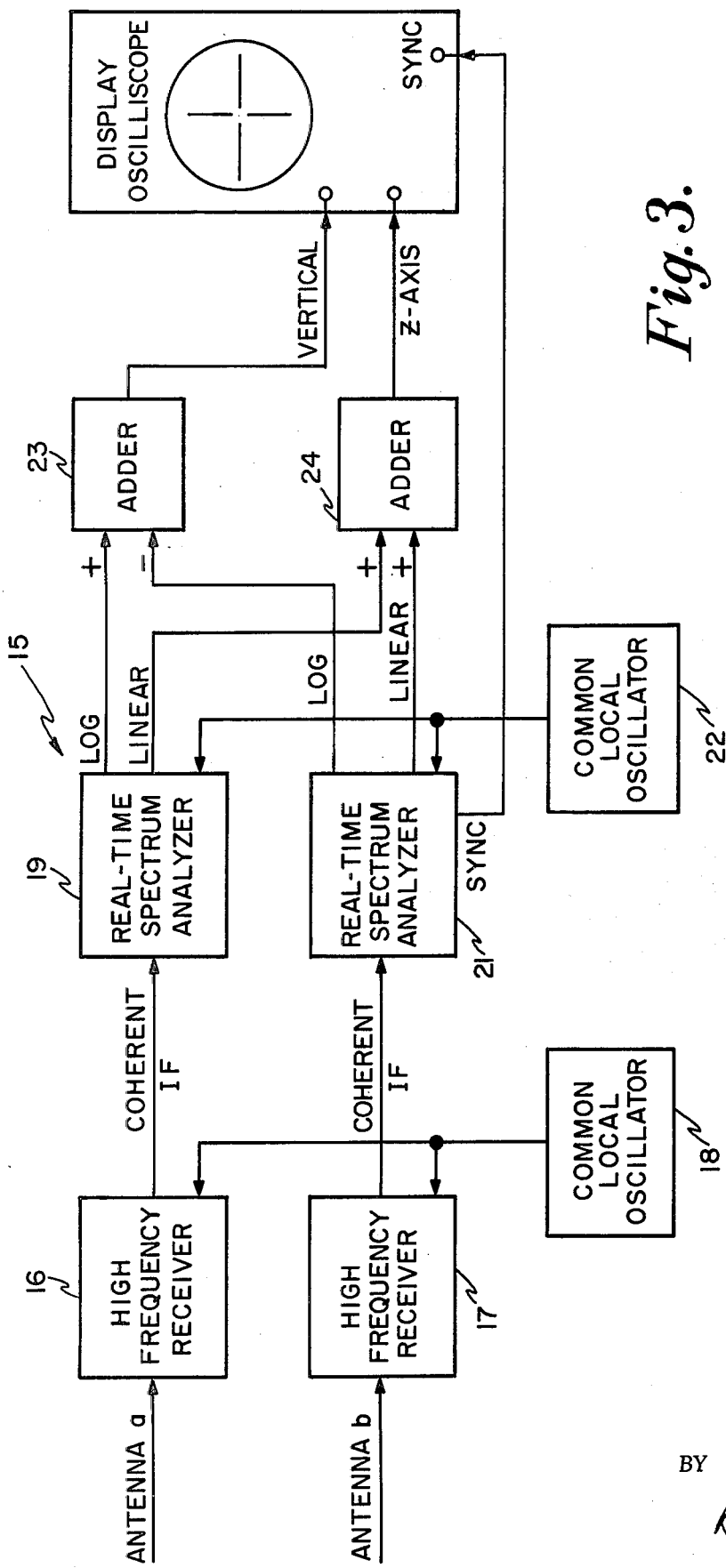
FIG. 3 is a block diagram of a preferred embodiment of a direction finding system.

Referring to FIG. 3 of the drawings, there is shown a system 15 in the form of a block diagram embodying the concepts of the present invention.

It is noted that two identical receivers 16 and 17 are used with a common local oscillator 18. Each receiver is connected to a separate beam of a monopulse antenna system (FIG. 2A). The receivers are coupled to two identical real-time spectrum analyzers 19 and 21. A common oscillator 22 is connected to the spectrum analyzers 19 and 21 so that the spectrum analyzers are synchronized to observe each specific frequency resolution cell simultaneously. The outputs of the channels of the spectrum analyzers are spectral signals and they can be compared on a resolution cell by resolution cell basis. Each mode produces one spectral signal from each spectrum analyzer.

The function which transforms relative amplitude to bearing depends on the actual beam shape. The logarithmic conversion is correct for a Gaussian shaped beam. The spectral outputs are logarithmically converted within the spectrum analyzers 19 and 21. The log output from the spectrum analyzer 21 is converted to a negative signal, whereas the log output of the spectrum analyzer 19 is converted to a positive output. The positive and negative signals are coupled to an adder 23 where they are added algebraically, yielding an azimuth bearing signal designated in FIG. 3.

Since only a few frequency cells contain significant energy, a measure of amplitude is also provided. This is achieved by simply adding the linear amplitude output differential Doppler spectral signals from the spectrum analyzers 19 and 21 in adder 24. The linear sum signal may be further processed to yield a functional dependence necessary to optimize the oscilloscope display.

Thus, two pieces of information about each frequency resolution cell — the log of the ratio of the amplitude and the linear sum of the amplitudes — are produced. As indicated from Equation 1, the former is proportional to the bearing angle. The latter is proportional to the significance of the bearing.

This information may be conventionally displayed on a rectilinear oscilloscope display where the linear sequential frequency cell information corresponds to the X-axis displacement (time base) and the bearing (log ratio of each cell) to Y-axis displacement. The significance (linear amplitude cell) is indicated by Z-axis modulation of the scope.

The foregoing is illustrated in FIG. 4. It will be noted that although information is obtained throughout the sampling period, only two portions of the display are accentuated, $A_1$ and $A_2$. These portions correspond to the information obtained from the two incoming modes $A_1$ and $A_2$. It will be noted that the accentuated signals $A_1$ and $A_2$ are displaced approximately the same distance along the Y-axis, thus indicating substantially identical angles of arrival in this instance.

Another application of the invention relates to the target detection. FIG. 5 shows a target 35 moving across a transmission-receiving path. In a course of its movement, the target will cause to be generated multiple Doppler modes 30–33.

The straight line 30 joining the transmitter and receiver represents the great circle azimuth. It is apt to be a much stronger signal than modes 31–33 and generally it is advisable to suppress this mode by means of a notch filter in the receiver.

In FIG. 6 there is a display of azimuth vs. time. The socalled carrier mode 30 is represented by zero. Frequency modes 31–33 will generate target signatures 31' – 33'. This information can be translated into azimuth information relative to the great circle azimuth in the manner described heretofore.

An interesting advantage of this particular technique is that in the event an electronic counter-measure transmitter 34 (FIG. 5) is transmitting, it too will generate a mode which will be picked up by the receiver and analyzed in the manner described heretofore. However, the azimuth of the electronic counter-measure transmitter remains fixed and appears on the FIG. 6 display as a horizontal line 36. It is thus possible to distinguish between target and electronic counter-measure information.

Doppler shifted modes are received from Auroras and add to the confusion of target detection by prior art techniques. An Aurora shows up as an easily recognized spurious azimuth using spectrum analysis of Doppler shifted modes and amplitude or phase responses.

Another wave-form which is compatible with this technique is one where transmitted signal is a signal which varies linearly over a finite frequency. It is in effect a sawtooth signal 37 in FIG. 7. This particular type of transmission gives rise to still another type of application with regard to the invention.

It is well known that a period of time passes from the time a transmitted signal reaches a target and returns to the receiver. During this time, the receiver sees a signal having a frequency different than the transmitted frequency. The difference in frequency is shown in FIG. 7 as dt. When the amplitude of these two different frequency signals are compared in either a signal antenna or a Doppler monopulse type of antenna system, in the manner described, the frequencies of the two signals is indicative of the range between the transmitter and the receiver in which incidentally are located at the same spot.

The inventive concept may also be practiced with sequential lobing apparatus providing the Doppler shift or polarization of the received signal does not occur within the time frame of switching of the two antennae that are typically used in sequential lobing. FIG. 8 depicts the use of the inventive concept in connection with the phase monopulse techniques. For example, antennae $A_3$ and $A_4$ are directed along the axis of symmetry 37. A target appears at location 38. The reflected signal moves toward the antennae as a wavefront 39. It is clear that the wave-front will reach antenna 34 a short time before it reaches antenna $A_3$. This difference in time gives rise to a difference in phase between the signals received by antennae $A_3$ and $A_4$. This phenomenon is used in phased array systems and is also well known as phase monopulse or inferometer. As was previously mentioned, the use of phase information requires more complex and sophisticated equipment than is required where amplitude information is used.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. A direction finding system for transmissions providing multiple receiving frequency shifted modes comprising:
   receiving means including antenna means having an amplitude ratio functional relationship with respect to bearing for receiving and isolating at least a pair of frequency shifted signals for each transmission received;
   means for spectrum analyzing each of the frequency shifted signals for generating a pair of like frequency spectral signals from each frequency shifted mode separated by at least one frequency resolution cell; and
   computing means for generating an azimuth signal which is a function of the amplitude ratio of each pair of spectral signals.

2. A system as defined in claim 1 in which said receiving means is a Doppler monopulse means.

3. A system as defined in claim 1 which includes in addition display means for displaying a function of the amplitude ratio of the spectral signals as an azimuthal signal.

4. A system as defined in claim 3 which includes means for displaying azimuth as a function of frequency on the Y and X axis, respectively, of an oscilloscope and significance information as a Z axis intensifier.

5. A method of finding the direction from which a transmission, resulting in multiple received frequency shifted modes, is emanating comprising the steps,
   generating a pair of like frequency received signals that have amplitude ratio functional relationship with respect to bearing from each frequency shifted mode; and
   obtaining a spectrum analysis of each frequency shifted mode for generating a pair of like frequency spectral signals from each pair of received signals, and computing the ratio of the amplitudes of each pair of spectral signals in the same frequency resolution cell whereby obtaining a signal representing the azimuth of each received mode.

6. A method as described in claim 5 where said frequency shifted modes are received by amplitude monopulse techniques.

7. A method of detecting a moving target comprising:
   propagating a signal capable of being converted into at least one frequency shifted mode;
   receiving means including antenna means having an amplitude ratio functional relationship with respect to bearing for receiving and for separating at least one frequency shifted mode;
   means for spectrum analyzing a frequency shifted mode for generating a pair of like frequency spectral signals for each frequency shifted mode; and computing means for generating an azimuth signal which is a function of the amplitude ratio of each pair of spectral signals.

8. A method as described in claim 7 wherein the propagated signal may be converted into at least one Doppler shifted mode by the moving target.

9. A method as described in claim 7 wherein the propagating signal varies in frequency linearly with time.

10. A direction finding system for transmissions providing multiple receiving frequency shifted modes comprising:
receiving means including antenna means of an amplitude ratio functional relationship with respect to bearing for receiving and isolating at least a pair of frequency shifted signals for each transmission received;
means for spectrum analyzing each of the frequency shifted signals for generating a pair of like frequency spectral signals from each frequency shifted mode separated by at least one frequency resolution cell; and
computing means for generating an azimuth signal which is a function of the phase difference of each pair of spectral signals.

11. A system as defined in claim 10 in which said receiving means is a Doppler monopulse means.

12. A system as defined in claim 10 which includes in addition display means for displaying a function of the phase difference of the signal as an azimuthal signal.

13. A system as defined in claim 12 which includes means for displaying azimuth as a function of frequency on the Y and X axis, respectively, of an oscilloscope and significance information as a "Z" axis intensifier.

14. A method of finding the direction from which a transmission, resulting in multiple received frequency shifted modes, is emanating comprising the steps,
generating a pair of like frequency received signals that have a phase difference functional relationship with respect to bearing from each frequency shifted mode; and
obtaining a spectrum analysis of each frequency shifted mode for generating a pair of like frequency spectral signals from each pair of received signals, and computing the phase difference of each pair of spectral signals in the same frequency resolution cell whereby obtaining a signal representing the azimuth of each received mode.

15. A method as described in claim 14 where said frequency shifted modes are received by phase difference techniques.

16. A method of detecting a moving target comprising:
propagating a signal capable of being converted into at least one frequency shifted mode;
receiving means including antenna means having a phase difference functional relationship with respect to bearing for receiving and for separating at least one frequency shifted mode;
means for spectrum analyzing a frequency shifted mode for generating a pair of like frequency spectral signals for each frequency shifted mode; and
computing means for generating an azimuth signal which is a function of the phase difference of each pair of spectral signals.

17. A method as described in claim 16 where the propagated signal may be converted into at least one frequency shifted mode by the moving target.

18. A method as described in claim 16 wherein the propagating signal varies in frequency linearly with time.

* * * * *